United States Patent
Oshiumi et al.

(10) Patent No.: US 11,306,250 B2
(45) Date of Patent: Apr. 19, 2022

(54) SURFACE PROTECTION COMPOSITION AND TERMINAL FITTED ELECTRIC WIRE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP); KYUSHU UNIVERSITY, NATIONAL UNIVERSITY CORPORATION, Fukuoka (JP)

(72) Inventors: Naoyuki Oshiumi, Yokkaichi (JP); Takehiro Hosokawa, Yokkaichi (JP); Makoto Mizoguchi, Fukuoka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 0 days.

(21) Appl. No.: 16/892,998

(22) Filed: Jun. 4, 2020

(65) Prior Publication Data
US 2020/0403327 A1 Dec. 24, 2020

(30) Foreign Application Priority Data
Jun. 21, 2019 (JP) .............................. JP2019-115065

(51) Int. Cl.
*C09K 15/32* (2006.01)
*H01R 4/70* (2006.01)
*H01B 3/20* (2006.01)

(52) U.S. Cl.
CPC .............. *C09K 15/32* (2013.01); *H01B 3/20* (2013.01); *H01R 4/70* (2013.01)

(58) Field of Classification Search
CPC ........ C09K 15/00; C09K 15/02; C09K 15/04; C09K 15/06; C09K 15/32; C09K 15/322;
(Continued)

(56) References Cited

U.S. PATENT DOCUMENTS 10,622,741 B2 * 4/2020 Takata ................ C23F 11/1673
2010/0256027 A1 10/2010 Miyamoto et al.
(Continued)

FOREIGN PATENT DOCUMENTS

JP H06-33272 A 2/1994
JP 4811408 B2 11/2011
(Continued)

OTHER PUBLICATIONS

Dec. 3, 2021 Office Action issued in Chinese Patent Application No. 202010488513.7.

*Primary Examiner* — Matthew R Diaz
(74) *Attorney, Agent, or Firm* — Oliff PLC

(57) ABSTRACT

Provided is a surface protection composition excellent in anticorrosion property for preventing metal corrosion as well as excellent in uniform applicability and heat resistance, and a terminal-fitted electric wire treated with the composition. The surface protection composition contains a phosphorus compound (a) represented by the general formula (1) in an amount of 0.1 to 10 mass % in terms of phosphorus element with respect to the total amount of the composition, at least one selected from the group consisting of a phosphorus compound (b1) represented by the general formula (2) and a carboxylic acid compound (b2) represented by the general formula (3) in an amount of 5.0 to 60 mass % with respect to the total amount of the composition, (Continued)

a metal-containing compound (c) in an amount of 0.1 to 10 mass % in terms of metal element with respect to the total amount of the composition, and a lubricant base oil (d).

12 Claims, 2 Drawing Sheets

(58) Field of Classification Search
CPC ...... C09K 15/326; C23F 11/12; C23F 11/124; C23F 11/167; C23F 11/1673; H01B 3/20; H01B 3/22; H01B 7/28; H01B 7/2806; H01B 7/282; C09D 5/08
USPC .......................... 252/399, 400.1, 400.2, 407
See application file for complete search history.

(56) References Cited

U.S. PATENT DOCUMENTS

| | | | |
|---|---|---|---|
| 2017/0062954 A1* | 3/2017 | Hase | C09D 5/08 |
| 2017/0117650 A1* | 4/2017 | Yoshida | C23F 11/1673 |
| 2018/0163154 A1* | 6/2018 | Nakashima | H01B 7/2806 |
| 2019/0375998 A1 | 12/2019 | Tanaka et al. | |

FOREIGN PATENT DOCUMENTS

| | | | | |
|---|---|---|---|---|
| JP | 2018-090690 A | 6/2018 | | |
| WO | WO-2017119290 A1 * | 7/2017 | .......... | C23F 11/1673 |
| WO | WO-2017169578 A1 * | 10/2017 | .......... | C10M 169/00 |

* cited by examiner

SURFACE PROTECTION COMPOSITION AND TERMINAL FITTED ELECTRIC WIRE

TECHNICAL FIELD

The present disclosure relates to a surface protection composition and a terminal fitted electric wire, and more specifically, to a surface protection composition excellent in anticorrosion property for preventing metal corrosion, and a terminal fitted electric wire treated with the composition, which is excellent in anticorrosion property.

BACKGROUND ART

For metal devices and parts, grease is used for the purpose of lubrication and corrosion resistance. For example, Patent Literature 1 describes a grease containing a perfluoroether base oil, a consistency improver, and barium sulfate or antimony oxide, which is used for machinery parts. Patent Literature 2 describes a composition containing a lubricant base oil and a gelling agent, which is used for protecting a metal surface.

CITATION LIST

Patent Literature

Patent Literature 1: JP 4811408 B
Patent Literature 2: JP Hei06-033272 A
Patent Literature 3: JP 2018-090690 A

SUMMARY OF INVENTION

Problems to be Solved by the Invention

The compositions disclosed in Patent Literatures 1 and 2 contain no metal adsorbing component and exhibit weak adsorption to the metal surface. Thus, when they are applied to the metal surface, they exhibit poor anticorrosion property for preventing metal corrosion. As the grease is a semi-solid or solid material obtained through dispersion of a consistency improver in a lubricant base oil, heating the grease significantly lowers the viscosity and improves the applicability of the grease; however, the grease becomes easy to leak out and lower its heat resistance. Also, since the composition disclosed in Patent Literature 2 is a gel-like solid obtained by addition of the gelling agent to a lubricant base oil, heating makes the composition liquid easily and improves the applicability of the composition. In this case, the composition may become hard to leak out even under a high temperature condition when a proper gelling agent is selected; however, the temperature suitable for applying such a composition that hardly leaks out under the high temperature condition to the metal surface tends to be high, which deteriorates the applicability of the composition. Meanwhile, the composition containing no gelling agent has high fluidity and can be applied uniformly; however, it is difficult to suppress leakage under the high temperature condition.

It is an object of the present disclosure to provide a surface protection composition excellent in anticorrosion property as well as uniform applicability and heat resistance, and a terminal-fitted electric wire treated with the composition.

Solution to Problem

In order to solve the foregoing problem, the surface protection composition contains a phosphorus compound (a) represented by the general formula (1) in an amount of 0.1 to 10 mass % in terms of phosphorus element with respect to the total amount of the composition, at least one selected from the group consisting of a phosphorus compound (b1) represented by the general formula (2) and a carboxylic acid compound (b2) represented by the general formula (3) in an amount of 5.0 to 60 mass % with respect to the total amount of the composition, a metal-containing compound (c) in an amount of 0.1 to 10 mass % in terms of metal element with respect to the total amount of the composition, and a lubricant base oil (d):

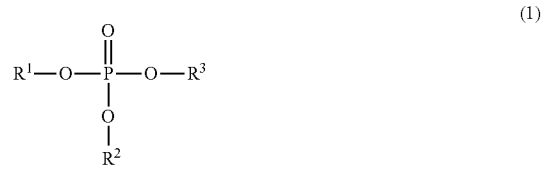

(1)

where $R^1$ represents a hydrogen atom, $R^2$ represents a hydrocarbon group with 4 to 30 carbon atoms having one or more branched chains or one or more carbon-carbon double bonds, and $R^3$ represents a hydrogen atom or a hydrocarbon group with 4 to 30 carbon atoms;

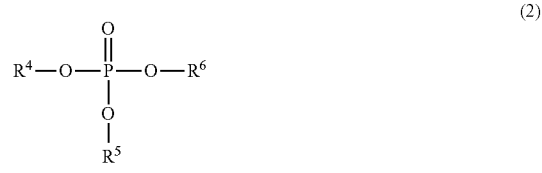

(2)

where $R^4$ represents a hydrogen atom, $R^5$ represents a linear hydrocarbon group with 12 to 22 carbon atoms, and $R^6$ represents a hydrogen atom or a hydrocarbon group with 12 to 22 carbon atoms;

$$R^7\text{—COOH} \tag{3}$$

where $R^7$ represents a linear hydrocarbon group with 11 to 21 carbon atoms.

In the surface protection composition, a mass ratio (a):{(b1)+(b2)} of the compound (a) to the total of the compound (b1) and the compound (b2) is preferably within a range of 5:95 to 95:5. The metal in the compound (c) is preferably at least one selected from the group consisting of alkali metals, alkaline earth metals, aluminum, titanium, and zinc. The oil (d) is preferably contained in the composition in an amount of 5.0 to 90 mass % with respect to the total amount of the composition. The oil (d) preferably has a kinematic viscosity of 10 mm²/s or higher at 100° C. and a number-average molecular weight of 400 or higher.

The terminal-fitted electric wire according to the present disclosure contains a terminal, an electric conductor, and an electric connection part formed between the terminal and the electric conductor, covered with the surface protection composition.

Advantageous Effects of Invention

Since the surface protection composition according to the present disclosure contains the compound (a) and the compound (c), the composition is adsorbed onto the metal surface to which it is applied. Since the compound (a) has a hydrocarbon group with 4 to 30 carbon atoms having a branched chain or a carbon-carbon double bond, and since the composition further contains the oil (d), the composition forms a uniform coating film on a metal surface. Further, the composition contains at least one selected from the group consisting of the compound (b1) and the compound (b2), which are compounds having hydrocarbon groups with relatively long straight chains. Thus, the composition is hard to flow of the protection composition even under the high temperature condition. Therefore, the surface protection composition is excellent in anticorrosion property as well as uniform applicability and heat resistance.

In the terminal-fitted electric wire according to the present disclosure, the electric connection part between the terminal and the electric conductor is covered with the surface protection composition. Consequently, the terminal-fitted electric wire is excellent in anticorrosion property as well as uniform applicability of the composition and heat resistance.

DESCRIPTION OF EMBODIMENTS

Figure 1:
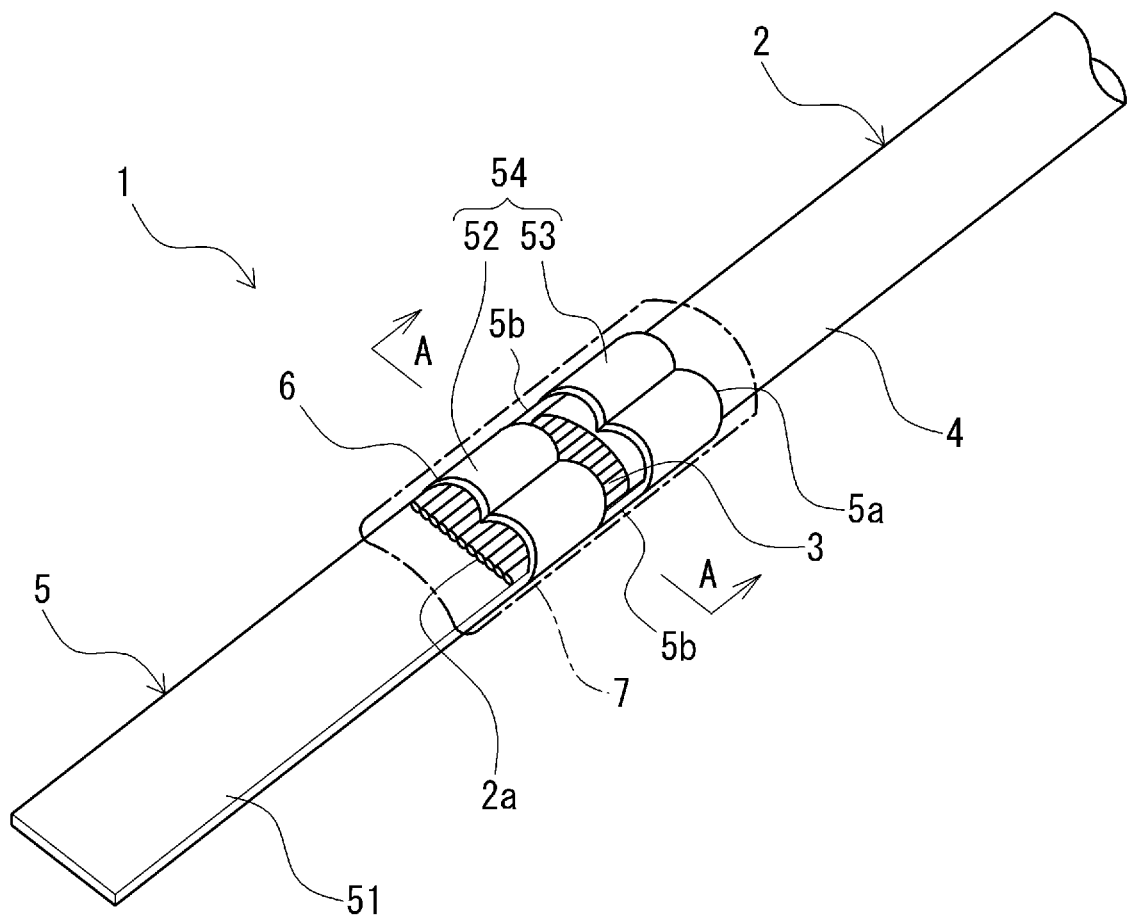
FIG. 1 is a perspective view of a terminal-fitted electric wire according to a preferred embodiment of the present disclosure.

Next, a preferred embodiment of the present disclosure is to be described specifically.

The surface protection composition according to the preferred embodiment of the present disclosure (hereinafter referred to as the present protection composition) contains a phosphorus compound (a), at least one selected from the group consisting of a phosphorus compound (b1) and a carboxylic acid compound (b2), a metal-containing compound (c), and a lubricant base oil (d) at a predetermined ratio.

The compound (a) is represented by the general formula (1) presented below. The compound (a) includes a part having low polarity (i.e., a lipophilic part) consisting of a hydrocarbon group and another part having high polarity consisting of a phosphate group.

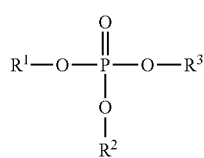

(1)

In the general formula (1), $R^1$ represents a hydrogen atom, $R^2$ represents a hydrocarbon group with 4 to 30 carbon atoms having one or more branched chains or one or more carbon-carbon double bonds, and $R^3$ represents a hydrogen atom or a hydrocarbon group with 4 to 30 carbon atoms.

The compound (a), having a hydrocarbon group with 4 to 30 atoms, is highly compatible with the oil (d) such as a long-chain alkyl compound. Thus, the present protection composition can hold the oil (d), preventing the oil (d) from separation. When the number of carbon atoms in the hydrocarbon group is less than 4, the compound (a) tends to crystallize and the compatibility with the oil (d) is lowered, which possibly leads to separation of the oil (d). On the other hand, when the number of carbon atoms in the hydrocarbon group is more than 30, viscosity of the compound (a) becomes so high that the uniform applicability of the present protection composition is lowered even when the oil (d) is mixed. From a viewpoint of compatibility with the oil (d), the number of carbon atoms in the hydrocarbon group is preferably 5 or more, and more preferably 6 or more. Further, from a viewpoint of uniform applicability of the present protection composition, the number of carbon atoms in the hydrocarbon group is preferably 26 or less, and more preferably 22 or less. In addition, the compound (a) having one or more branched chains or one or more carbon-carbon double bonds hardly crystallizes and provides sufficient compatibility with the oil (d).

In the general formula (1), $R^3$ may be a hydrocarbon group either the same as or different from the hydrocarbon group represented by $R^2$. Preferably, $R^3$ is a hydrogen atom or a hydrocarbon group which is the same as $R^2$.

Examples of the hydrocarbon group with 4 to 30 carbon atoms having one or more branched chains as $R^2$ include an alkyl group with 4 to 30 carbon atoms having one or more branched chains, a cycloalkyl group with 4 to 30 carbon atoms, an alkyl-substituted cycloalkyl group with 4 to 30 carbon atoms, and an alkenyl group with 4 to 30 carbon atoms having one or more branched chains. Preferable examples of the hydrocarbon group with 4 to 30 carbon atoms having one or more branched chains include an isobutyl group, a tert-butyl group, a neopentyl group, an isopentyl group, a 2-ethylhexyl group, an isodecyl group, an isostearyl group, a butyloctyl group, an isomyristyl group, an isocetyl group, a hexyldecyl group, an isobehenyl group, an octyldecyl group, and an octyldodecyl group.

Examples of the hydrocarbon group with 4 to 30 carbon atoms having one or more carbon-carbon double bonds as $R^2$ include an alkenyl group with 4 to 30 carbon atoms and a cycloalkenyl group with 4 to 30 carbon atoms. Preferable examples of the hydrocarbon group with 4 to 30 carbon atoms having one or more carbon-carbon double bonds include a butenyl group, a pentenyl group, a hexenyl group, a heptenyl group, an octenyl group, a nonenyl group, a decenyl group, an undecenyl group, a dodecenyl group, a tridecenyl group, a tetradecenyl group, a pentadecenyl group, a hexadecenyl group, a heptadecenyl group, an octadecenyl group, and an oleyl group.

Examples of the hydrocarbon group as $R^3$ include an alkyl group, a cycloalkyl group, an alkyl-substituted cycloalkyl group, an alkenyl group, an aryl group, an alkyl-substituted aryl group, and an aryl alkyl group. Among them, an aliphatic hydrocarbon group or an alicyclic hydrocarbon group such as the alkyl group, the cycloalkyl group, the alkyl-substituted cycloalkyl group, and the alkenyl group is preferred. When the hydrocarbon group as $R^3$ is the aliphatic hydrocarbon group or the alicyclic hydrocarbon group, compatibility of the compound (a) with the oil (d) is improved.

The alkyl group may be either linear or branched. Examples of the alkyl group include a butyl group, an isobutyl group, a tert-butyl group, a pentyl group, hexyl group, a heptyl group, an octyl group, a 2-ethylhexyl group, a nonyl group, a decyl group, an undecyl group, a dodecyl group, a tridecyl group, a tetradecyl group, a pentadecyl group, a hexadecyl group, a heptadecyl group, an octadecyl group (a stearyl group), an isostearyl group, a butyloctyl group, a myristyl group, an isomyristyl group, an isocetyl group, a hexyldecyl group, an octyldecyl group, an octyldodecyl group, a behenyl group, and an isobehenyl group.

Examples of the cycloalkyl group include a cyclopentyl group, a cyclohexyl group, and a cycloheptyl group. Examples of the alkyl-substituted cycloalkyl group include a methylcyclopentyl group, a dimethylcyclopentyl group, a methylethylcyclopentyl group, a diethylcyclopentyl group, a methylcyclohexyl group, a dimethylcyclohexyl group, a methylethylcyclohexyl group, a diethylcyclohexyl group, a methylcycloheptyl group, a dimethylcycloheptyl group, a methylethylcycloheptyl group, and a diethylcycloheptyl group. The substitution position of the alkyl-substituted cycloalkyl group is not particularly specified.

The alkenyl group may be either linear or branched. Examples of the alkenyl group include a butenyl group, a pentenyl group, a hexenyl group, a heptenyl group, an octenyl group, a nonenyl group, a decenyl group, an undecenyl group, a dodecenyl group, a tridecenyl group, a tetradecenyl group, a pentadecenyl group, a hexadecenyl group, a heptadecenyl group, an octadecenyl group, and an oleyl group.

Examples of the aryl group include a phenyl group, and a naphthyl group. Examples of the alkyl-substituted aryl group include a tolyl group, a xylyl group, an ethylphenyl group, a propylphenyl group, a butylphenyl group, a pentylphenyl group, a hexylphenyl group, a heptylphenyl group, an octylphenyl group, a nonylphenyl group, a decylphenyl group, an undecylphenyl group and a dodecylphenyl group. The substitution position of the alkyl substituted aryl group is not particularly restricted. The alkyl group of the alkyl substituted aryl group may be linear or branched. Examples of the aryl alkyl group include, a benzyl group, a phenylethyl group, a phenylpropyl group, a phenylbutyl group, a phenylpentyl group, and a phenylhexyl group. The alkyl group of the aryl alkyl group may be linear or branched.

Specific examples of the phosphorus compound (a) having a branched chain represented by the above-described general formula (1) include isobutyl acid phosphate, 2-ethylhexyl acid phosphate, isodecyl acid phosphate, butyloctyl acid phosphate, isomyristyl acid phosphate, isocetyl acid phosphate, hexyldecyl acid phosphate, isostearyl acid phosphate, isobehenyl acid phosphate, octyldecyl acid phosphate, octyldodecyl acid phosphate, di-butyloctyl acid phosphate, di-isomyristyl acid phosphate, di-isocetyl acid phosphate, di-hexyldecyl acid phosphate, di-isostearyl acid phosphate, di-isobehenyl acid phosphate, di-octyldecyl acid phosphate, di-octyldodecyl acid phosphate, di-isobutyl acid phosphate, di-2-ethylhexyl acid phosphate and di-isodecyl acid phosphate. Further, specific examples of the phosphorus compound (a) having a carbon-carbon double bond represented by the above-described general formula (1) include oleyl acid phosphate, di-oleyl acid phosphate, palmitoleic acid phosphate, di-palmitoleic acid phosphate, elaidyl acid phosphate, and di-elaidyl acid phosphate.

The present protection composition contains 0.1 to 10 mass % of the compound (a) in terms of phosphorus element with respect to the total amount of the composition. When the content of the compound (a) is lower than 0.1 mass %, the present protection composition exhibits weak adsorption to a metal surface, and the effect of suppressing corrosion of the metal surface is lowered. When the content of the compound (a) is higher than 10 mass %, a sufficient amount of at least one selected from the group consisting of the compound (b1) and the compound (b2) can not be contained in the composition, which lowers the effect of suppressing flow of the present protection composition under the high temperature condition, and deteriorates heat resistance. From a viewpoint of adsorption to a metal surface, the content of the compound (a) is preferably 0.5 mass % or higher, and more preferably 1.0 mass % or higher. In addition, from a viewpoint of heat resistance, the content of the compound (a) is preferably 8.0 mass % or lower, and more preferably 5.0 mass % or lower. Here, the high temperature condition refers to a condition where the environment temperature is 155° C.

At least one selected from the group consisting of the compound (b1) and the compound (b2) (hereinafter referred to as compound (b1) or (b2)) has a hydrocarbon group having a relatively long straight chain, but does not have a branched chain or a carbon-carbon double bond. Thus, the compound has high crystallinity. When the compound (b1) or (b2) crystallizes in the present protection composition, the present protection composition becomes hard to flow even placed under the high temperature condition, and exhibits excellent heat resistance. From this viewpoint, the compound (b1) or (b2) has a hydrocarbon group having a chain of a predetermined length described below. Of the compound (b1) and the compound (b2), the compound (b1) is more preferred because of its higher softening temperature and lower fluidity under the high temperature condition, for example.

The phosphorus compound (b1) is represented by the following general formula (2). The compound (b1) has a part consisting of a hydrocarbon group having low polarity (i.e., a lipophilic part) and another part consisting of a phosphate group having high polarity.

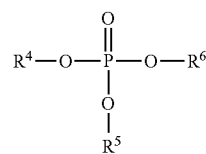

(2)

In the general formula (2), $R^4$ represents a hydrogen atom, $R^5$ represents a linear hydrocarbon group with 12 to 22 carbon atoms, and $R^6$ represents a hydrogen atom or a hydrocarbon group with 12 to 22 carbon atoms. Preferably, $R^6$ is a hydrogen atom or a hydrocarbon group which is the same as $R^5$.

When the number of carbon atoms in the hydrocarbon group as $R^5$ is less than 12, crystallinity of the compound (b1) is low. Thus, the present protection composition flows under the high temperature condition and exhibits low heat resistance. On the other hand, when the number of carbon atoms in the hydrocarbon group as $R^5$ is more than 22, the compound (b1) hardly disperses.

Examples of the linear hydrocarbon group with 12 to 22 carbon atoms as $R^5$ include a dodecyl group (a lauryl group), a tridecyl group, a tetradecyl group (a myristyl group), a pentadecyl group, a hexadecyl group (a palmityl group), a heptadecyl group, an octadecyl group (a stearyl group), a nonadecyl group, an icocyl group, a henicocyl group, and a dococyl group (a behenyl group).

Examples of the hydrocarbon group as $R^6$ include an alkyl group, a cycloalkyl group, an alkyl-substituted cycloalkyl group, an alkenyl group, an aryl group, an alkyl-substituted aryl group, and an aryl alkyl group. Among them, an aliphatic hydrocarbon group or an alicyclic hydrocarbon group such as the alkyl group, the cycloalkyl group, the alkyl-substituted cycloalkyl group, and the alkenyl group is preferred. When the hydrocarbon group as $R^6$ is the aliphatic hydrocarbon group or the alicyclic hydrocarbon group, compatibility of the compound (b1) with the oil (d) is improved.

The alkyl group may be linear or branched. Examples of the alkyl group include a lauryl group, a dodecyl group, a tridecyl group, a tetradecyl group, a pentadecyl group, a hexadecyl group, a heptadecyl group, an octadecyl group, a stearyl group, an isostearyl group, a nonadecyl group, an icocyl group, a henicocyl group, a behenyl group, an isobehenyl group, a butyloctyl group, a myristyl group, an isomyristyl group, an isocetyl group, a hexyldecyl group, an octyldecyl group, and an octyldodecyl group.

The alkenyl group may be linear or branched. Examples of the alkenyl group include a dodecenyl group, a tridecenyl group, a tetradecenyl group, a pentadecenyl group, a hexadecenyl group, a heptadecenyl group, an octadecenyl group, and an oleyl group.

Examples of the alkyl-substituted aryl group include a hexylphenyl group, a heptylphenyl group, an octylphenyl group, a nonylphenyl group, a decylphenyl group, an undecylphenyl group, and a dodecylphenyl group. The substitution position of the alkyl substituted aryl group is not particularly restricted. The alkyl group of the alkyl-substituted aryl group may be linear or branched. Examples of the aryl alkyl group include a phenylhexyl group. The alkyl group of the aryl alkyl group may be linear or branched.

Specific examples of the phosphorus compound (b1) represented by the above-described general formula (2) include lauryl acid phosphate, tridecyl acid phosphate, stearyl acid phosphate, myristyl acid phosphate, palmityl acid phosphate, behenyl acid phosphate, di-lauryl acid phosphate, di-tridecyl acid phosphate, di-stearyl acid phosphate, di-miristyl acid phosphate, di-palmityl acid phosphate, di-behenyl acid phosphate.

The carboxylic acid compound (b2) is represented by the following general formula (3). The compound (b2) has a part consisting of a hydrocarbon group having low polarity (i.e., a lipophilic part) and another part consisting of a carboxylic acid group having high polarity.

$$R^7\text{—COOH} \quad (3)$$

In the general formula (3), $R^7$ represents a linear hydrocarbon group with 11 to 21 carbon atoms.

When the number of carbon atoms in the hydrocarbon group as $R^7$ is less than 11, crystallinity of the compound (b2) is low. Thus, the present protection composition flows under the high temperature condition and exhibits low heat resistance. On the other hand, when the number of carbon atoms in the hydrocarbon group as $R^7$ is more than 21, the compound (b2) hardly disperses.

Examples of the linear hydrocarbon group with 11 to 21 carbon atoms as $R^7$ include an undecyl group, a dodecyl group (a lauryl group), a tridecyl group, a tetradecyl group (a myristyl group), a pentadecyl group, a hexadecyl group (a palmityl group), a heptadecyl group, an octadecyl group (a stearyl group), a nonadecyl group, an icocyl group, and a henicocyl group.

Specific examples of the carboxylic acid compound (b2) represented by the above-described general formula (3) include dodecanoic acid (lauric acid), tetradecanoic acid (myristic acid), pentadecanoic acid, hexadecanoic acid (palmitic acid), heptadecanoic acid, octadecanoic acid (stearic acid), icosanoic acid, heneicosylic acid, docosanoic acid (behenic acid).

The present protection composition contains 5.0 to 60 mass % of the compound (b1) or (b2) with respect to the total amount of the composition. When the content is lower than 5.0 mass %, the present protection composition flows under the high temperature condition and exhibits poor heat resistance. When the content is higher than 60 mass %, the present protection composition solidifies at room temperature due to high crystallinity of the compound (b1) or the compound (b2), and hardly flows even when heated, whereby preventing the coating film to be uniformly formed on the metal surface. Thus, the effect of suppressing corrosion of the metal surface is lowered. Further, the content of the compound (a) becomes relatively so low that the present protection composition exhibits weak adsorption to a metal surface and has poor effect of suppressing corrosion of the metal surface. From a viewpoint of heat resistance, the content is preferably 10 mass % or higher, more preferably 15 mass % or higher, and still more preferably 20 mass % or higher. In addition, from a viewpoint of uniform applicability and adsorption to the metal surface, the content is preferably 50 mass % or lower, and more preferably 40 mass % or lower.

A mass ratio (a):{(b1)+(b2)} of the compounds (a) to the total of the compounds (b1) and (b2) is preferably within a range of 5:95 to 95:5. When the content of the compound (a) with respect to the total of the compounds (a), (b1), and (b2) is 5 mass % or higher, or the total content of the compounds (b1) and (b2) with respect to the total of the compounds (a), (b1), and (b2) is 95 mass % or lower, the present protection composition exhibits strong adsorption to a metal surface and shows excellent effect of suppressing corrosion of the metal surface. When the content of the compound (a) is 95 mass % or lower, or the total content of the compounds (b1) and (b2) is 5 mass % or higher, the present protection composition hardly flows even placed under the high temperature condition. Accordingly, the mass ratio (a):{(b1)+(b2)} is preferably within a range of 10:90 to 90:10, and more preferably within a range of 30:70 to 70:30.

The metal-containing compound (c) facilitates ionization of metal atoms at the metal surface, which allows the compound (a) to be adsorbed onto the metal surface. Thus, the present protection composition can be adsorbed onto the metal surface.

Examples of the metal-containing compound (c) include a metalhydroxide, and a metal oxide. Examples of the metal in the compound (c) include an alkali metal such as Li, Na, and K, an alkaline earth metal such as Mg and Ca, aluminum, titanium, and zinc. The compound (c) may be composed of a single metal-containing compound containing any one of these metals, or may be composed of two or more metal-containing compounds. When these metals having relatively high ionization tendency are present in the present protection composition, ionization of metal atoms at the metal surface is facilitated to allow the compound (a) to be strongly adsorbed onto the metal surface.

From a viewpoint of hydrophilicity, it is preferable that the metal in the compound (c) is a divalent or higher valent metal, such as an alkaline earth metal, aluminum, titanium, and zinc. Further, Ca and Mg are more preferred from a viewpoint of waterproofness.

The present protection composition contains 0.1 to 10 mass % of the compound (c) in terms of metal element with respect to the total amount of the composition. When the content of the compound (c) is lower than 0.1 mass %, the compound (a) forms ionic bonds to the metal surface and exhibits weak adsorption to the metal surface, and the effect of suppressing corrosion of the metal surface is lowered. When the content of the compound (c) is higher than 10 mass %, the excessive content of the metal-containing compound affects the property of the present protection composition, and deteriorates protecting effect of the present protection composition. From a viewpoint of adsorption of the compound (a), the content of the compound (c) is preferably 0.5 mass % or higher, and more preferably 1.0 mass or higher. In addition, the content is preferably 8.0 mass % or lower, and more preferably 5.0 mass % or lower.

The present protection composition contains the lubricant base oil. The composition can be a viscous liquid at room temperature by containing the lubricant base oil (d) together with the compound (a). When the present protection composition does not contain the oil (d), the composition solidifies at room temperature due to the presence of the compound (b1) or (b2), thus making the composition difficult to form the coating film uniformly on the metal surface. By containing the oil (d), the present protection composition uniformly forms the coating film on the metal surface. The content of the oil (d) is preferably 5.0 to 90 mass %, more preferably 10 to 70 mass %, and still more preferably 20 to 70 mass % with respect to the total amount of the composition.

The oil (d) used herein may be any one of a mineral oil, a wax isomerized oil, and a synthetic oil, which are usually used as a base oil of a lubricant oil, or a mixture of two or more of them. Specific examples of the mineral oil used herein include paraffinic and naphthenic oils, and n-paraffin, which are purified from lubricant oil fractions obtained by distillation of a crude oil under ordinary pressure or distillation under reduced pressure with appropriately combining purification treatments such as solvent deasphaltation, solvent extraction, hydrocracking, solvent dewaxing, catalytic dewaxing, hydrorefining, sulfuric acid cleaning, and white clay treatment of the lubricant oil fractions.

The wax isomerized oils used herein include any one of those prepared through a hydrogen isomerization treatment of a wax raw material, such as natural wax, e.g., petroleum slack wax obtained through solvent dewaxing of a hydrocarbon oil, or a synthetic wax formed by the so-called Fischer Tropsch synthetic process, in which a mixture of carbon monoxide and hydrogen is brought in contact with a suitable synthetic catalyst at a high temperature and a high pressure. In a case of using the slack wax as the wax raw material, since the slack wax contains large amounts of sulfur and nitrogen, which are unnecessary in the lubricant base oil, it is desirable that the slack wax is hydrogenated as needed to prepare a wax raw material reduced in the sulfur content and the nitrogen content.

Although not particularly limited, examples of the synthetic oil include a poly-α-olefin, such as a 1-octene oligomer, 1-decene oligomer, and ethylene-propylene oligomer or a hydrogenated product thereof, isobutene oligomer and hydrogenated product thereof, isoparaffin, alkylbenzene, alkylnaphthalene, diester (for example, ditridecyl glutarate, di-2-ethylhexyl adipate, diisodecyl adipate, ditridecyl adipate, and di-2-ethylhexyl sebacate), polyol ester (for example, trimethylolpropane caprylate, trimethylolpropane pelargonate, pentaerythritol-2-ethylhexanoate, and pentaerythritol pelargonate), polyoxyalkylene glycol, dialkyl diphenyl ether, and polyphenyl ether.

The kinematic viscosity of the oil (d) is not particularly limited. Usually, it is preferably from 1 to 150 mm$^2$/s at 100° C.

The oil (d) preferably has a kinematic viscosity of 10 mm$^2$/s or higher at 100° C. and a number-average molecular weight of 400 or higher. As the kinematic viscosity of the oil (d) increases, the kinematic viscosity of the present protection composition also increases, and thus the present protection composition becomes hard to flow under the high temperature condition, thereby improving the heat resistance. From this viewpoint, the kinematic viscosity is more preferably 15 mm$^2$/s or higher, and still more preferably 20 mm$^2$/s or higher. Further, from a viewpoint of applicability, the kinematic viscosity is more preferably 150 mm$^2$/s or lower, and still more preferably 120 mm$^2$/s or lower. The kinematic viscosity is measured according to JIS K2283.

When the oil (d) has the number-average molecular weight of 400 or higher, the sufficiently high molecular weight helps to suppress oxidative degradation of the oil (d) under the high temperature condition, thereby suppressing the kinematic viscosity to be lowered. When the kinematic viscosity of the oil (d) is maintained high under the high temperature condition, the present protection composition is made hard to flow even placed under the high temperature condition, thereby improving the heat resistance. From this viewpoint, the number-average molecular weight is more preferably 450 or higher. On the other hand, from a viewpoint of applicability, the number-average molecular weight is preferably 10000 or lower, and more preferably 8000 or lower.

The present protection composition may further contain a stabilizer, a corrosion inhibitor, a dye, a viscosity improver, or a filler, for example, as long as the function of the present protection composition is not deteriorated. It is preferable that the present protection composition should not contain a consistency improver (i.e., gelling agent), such as an amide compound, which forms a gel-like high-consistency material together with the lubricant base oil (d).

The present protection composition may be prepared either by mixing the compound (a), the compound (b1) or (b2), the compound (c) and the oil (d) at once, or by firstly mixing the compound (a) and the compound (c), and then mixing the compound (b1) or (b2), and the oil (d).

The surface of a material to be coated is coated with the present protection composition by applying the present protection composition onto the surface of the material or immersing the material into the present protection composition. A metal material can be used as the material to be coated. Examples of the metal material include metals suitable for use in a terminal metal fitting or an electric wire conductor, for example, such as copper, copper alloys, aluminum, aluminum alloys, and materials having various types of plated layers on these metals. When the present protection composition is applied to the surface of the material to be coated, the composition forms a coating film. In this way, the surface of the material is covered with the coating film of the present protection composition. A thickness of the coating film is not specifically limited, and may be adjusted within a range of 0.5 to 100 μm, for example.

The present protection composition, containing the compounds (a) and (c), is adsorbed onto the metal surface which the composition covers. Further, since the compound (a) has a hydrocarbon group with 4 to 30 atoms having a branched chain or a carbon-carbon double bond, and since the composition further contains the oil (d), the composition uniformly forms the coating film on the metal surface. Furthermore, since the composition contains the compound (b1) or (b2), which is a compound having a linear hydrocarbon group, flow of the composition under the high temperature condition is suppressed. Thus, the present protection composition exhibits excellent anti-corrosion property as well as uniform applicability and heat resistance. By containing the compound (b1) or (b2), the composition has excellent heat resistance even without a photo-curable resin such as a (meth)acrylic resin.

The present protection composition can be used for preventing corrosion. For example, the present protection composition may cover a surface of a metal part to be protected with closely contacting the surface, thereby preventing corrosion of the metal part. For example, the composition may be used to coat the surface of a terminal-fitted electric wire for preventing corrosion.

Next, a terminal-fitted electric wire according to the present disclosure is to be described.

A terminal-fitted electric wire according to the present disclosure contains an insulated electric wire and a terminal connected to a conductor end of the insulation electric wire. An electric connection portion between the terminal and the electric wire conductor is covered with the present protection composition. Thus, corrosion at the electric connection portion is prevented.

Figure 2:
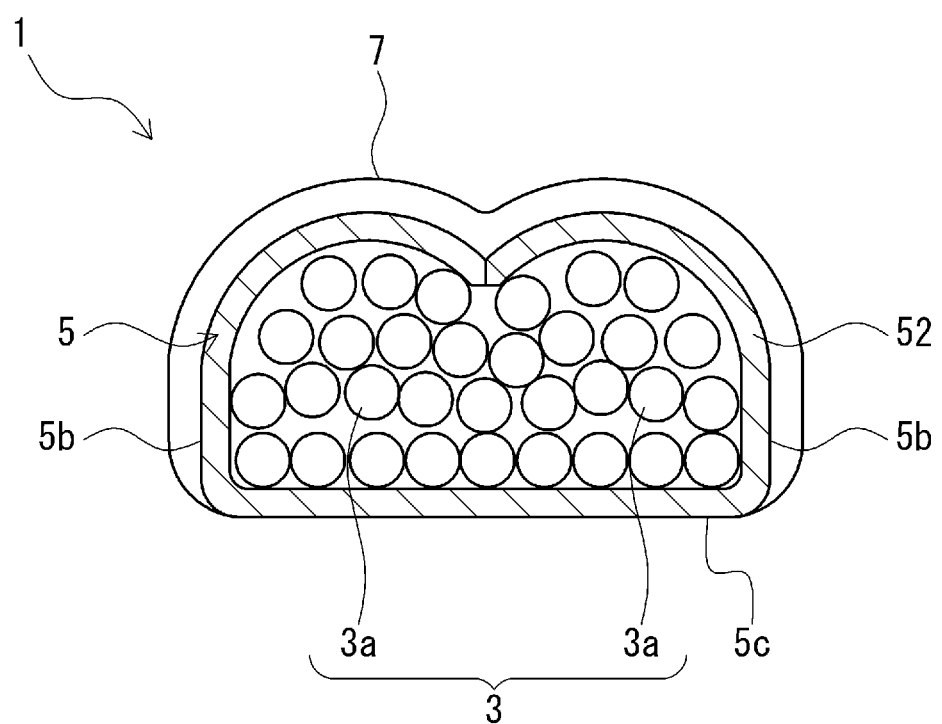
FIG. 2 is a longitudinal cross-sectional view along line A-A in FIG. 1.

FIG. 1 is a perspective view of a terminal-fitted electric wire according to a preferred embodiment of the present disclosure, and FIG. 2 is a vertical cross-sectional view along line A-A in FIG. 1. As illustrated in FIG. 1 and FIG. 2, a terminal-fitted electric wire 1 contains a covered electric wire 2 which contains an electric wire conductor 3 and an insulation covering (insulator) 4. The covered electric wire 2 and a terminal 5 are electrically connected through an electric connection portion 6.

The terminal 5 has a tab-shaped connection part 51 formed as an elongate flat plate to be connected with a mating terminal, and an electric wire fixing portion 54 containing a wire barrel 52 and an insulation barrel 53 formed at the extended end of the connection portion 51. The terminal 5 can be formed (or fabricated) to a predetermined shape through pressing of a metal plate material.

In the electric connection portion 6, the insulation covering 4 at the end of the covered electric wire 2 is stripped to expose the electric wire conductor 3, and the exposed electric wire conductor 3 is press-bonded to one side of the terminal 5, whereby the covered electric wire 2 is connected with the terminal 5. The wire barrel 52 of the terminal 5 is crimped over the electric wire conductor 3 of the covered electric wire 2 to electrically connect the electric wire conductor 3 with the terminal 5. Further, the insulation barrel 53 of the terminal 5 is crimped over the insulation covering 4 of the covered electric wire 2.

In the terminal-fitted electric wire 1, the region indicated with the dashed line is covered with a coating film 7 made of the present protection composition. To be specific, the region ranging from the top surface of the terminal 5 at a portion that is more in front than the distal end of the exposed portion of the electric wire conductor 3 that is exposed from the insulation covering 4 to the top surface of the insulation covering 4 at a portion that is more behind than the rear end of the exposed portion of the electric wire conductor 3 that is exposed from the insulation covering 4 is covered with the coating film 7. That is, the covered electric wire 2 is covered with the coating film 7 such that on the distal end 2a of the wire 2, the coating film 7 slightly extends off toward the connection part 51 of the terminal 5 from the distal end of the electric wire conductor 3. The terminal 5 is covered with the coating film 7 such that on the distal end 5a of the terminal 5, the coating film 7 slightly extends off toward the insulation covering 4 of the covered electric wire 2 from the end portion of the insulation barrel 53. As shown in FIG. 2, side surfaces 5b of the terminal 5 are also covered with the coating film 7. A back surface 5c of the terminal 5 may not be covered with the coating film 7 or may be covered with the coating film 7. The peripheral edge of the coating film 7 includes a portion in contact with the surface of the terminal 5, a portion in contact with the surface of the electric wire conductor 3, and a portion in contact with the surface of the insulation covering 4.

In this way, the electric connection portion 6 is covered with the coating film 7 at a predetermined thickness along the shape of the outer periphery of the terminal 5 and the covered electric wire 2. Thus, a portion of the electric wire 2 where the electric wire conductor 3 is exposed from the insulation covering 4 is completely covered with the coating film 7 so as not to be exposed to the outside. Accordingly, the electric connection portion 6 is completely covered with the coating film 7. Since the coating film 7 exhibits excellent adsorption to all of the electric wire conductor 3, the insulation covering 4, and the terminal 5, the coating film 7 prevents intrusion of moisture, for example, from the outside to the electric wire conductor 3 and the electric connection portion 6, which may cause corrosion of the metal portions. Further, since the coating film 7 exhibits strong adhesion, a gap is hard to be formed between the coating film 7 and any of the electric wire conductor 3, the insulation covering 4, and the terminal 5 at the peripheral edge of the coating film 7 even when the electric wire is bent, for example, in the processes through from production of the wire harness to attachment of the wire harness to a vehicle, thereby maintaining the waterproofness and anticorrosion property.

The present protection composition is applied to a predetermined area to form the coating film 7. The composition can be applied to form the coating film 7 by known methods such as dripping and painting.

The coating film 7 is formed at a predetermined thickness in the predetermined area. Preferably, the thickness is 0.1 mm or smaller. If the coating film 7 is excessively thick, it is difficult to insert the terminal 5 into a connector.

The electric wire conductor 3 of the covered electric wire 2 is a stranded wire composed of a plurality of wires 3a. In this case, the stranded wire may be composed of a single type of metal wires or two or more types of metal wires. Further, the stranded wire may also be composed of organic fibers in addition to metal wires. The stranded wire composed of a single type of metal wires means that all metal wires forming the stranded wire are formed of the same metal material, while the stranded wire composed of two or more types of metal wires means that the stranded wire contains metal wires formed of different metal materials. The stranded wire may also include reinforcing wires (tension members), for example, for reinforcing the covered electric wire 2.

Examples of the material for the metal wire forming the electric wire conductor 3 include copper, copper alloys, aluminum, aluminum alloys, or materials having various types of plated layers on these metals. The material for the metal wire as the reinforcing wires may be, for example, copper alloys, titanium, tungsten, or stainless. Further, the organic fibers as the reinforcing wire may be, for example, KEVLAR. From a viewpoint of reducing the weight, the metal wires forming the electric wire conductor 3 are preferably aluminum, aluminum alloys, or materials having various types of plated layers on these metals.

The material for the insulation covering 4 may be, for example, rubber, polyolefin, PVC, or thermoplastic elastomer. They may be used alone or two or more of them may be used in combination. Various additives may be added as required to the material of the insulation covering 4. Examples of the additives include flame retardants, fillers, and colorants.

The material for the terminal 5 (material for a substrate) may be copper or various copper alloys, including generally used brass. The surface of the terminal 5 may be plated with various metals such as tin, nickel and gold. The surface may be plated partially, for example including the contact surface, or entirely.

While a terminal is press-bonded to the end of the electric wire conductor in the terminal-fitted electric wire 1 illustrated in FIG. 1, other known electric connection methods such as welding may also be used instead of the press-bonding for connection.

Example

The present disclosure is to be described by way of examples but the present disclosure is not restricted to the examples.

(Preparation of Surface Protection Composition)

<Sample 1>

To a methanol solution containing oleyl acid phosphate (a1) and lauryl acid phosphate (b1-1), calcium hydroxide (c1) was added. The mixture was stirred at room temperature, and methanol was distilled off. Then, as a lubricant base oil, a mineral base oil (d1) was added to the mixture to prepare a surface protection composition. Content ratio of the compounds (in mass %) is shown in Table 1.

Oleyl acid phosphate (a1): A phosphorus compound having a hydrocarbon group with 18 carbon atoms having a carbon-carbon double bond.

Lauryl acid phosphate (b1-1): A phosphorus compound having a linear hydrocarbon group with 12 carbon atoms.

<Samples 2-10>

Surface protection compositions were prepared in the same way as Sample 1 according to the content ratios (in mass %) shown in Table 1.

2-Ethylhexyl acid phosphate (a2): A phosphorus compound having a hydrocarbon group with 18 carbon atoms having a branched chain.

Lauric acid (b2-1): Linear carboxylic acid with 12 carbon atoms.

Behenic acid (b2-2): Linear carboxylic acid with 22 carbon atoms.

<Sample 11>

A surface protection composition was prepared according to the content ratio (in mass %) shown in Table 1, without any of the compound (b1) and the compound (b2).

<Sample 12>

A surface protection composition was prepared according to the content ratio (in mass %) shown in Table 1, without the compound (a).

<Sample 13>

A surface protection composition was prepared with caprylic acid (x1) instead of the compound (b2) according to the content ratio (in mass %) shown in Table 1.

Caprylic acid (x1): Linear carboxylic acid with 8 carbon atoms.

<Sample 14>

A surface protection composition was prepared according to the content ratio (in mass %) shown in Table 1, without the oil (d).

<Sample 15 and 16>

Surface protection compositions were prepared according to the content ratios (in mass %) shown in Table 1. The amount of the compound (b1) is too large in Sample 15 while it is too small in Sample 16.

<Evaluation>

(Uniform Applicability)

Onto a copperplate of 2 cm×2 cm, 0.05 g of each of the above-prepared surface protection compositions was dropped at 120° C. in a spot shape. Then, the state of the coating film was evaluated by visual observation. If the surface protection composition formed a uniform coating film, the composition was evaluated as "good". If the composition formed a non-uniform coating film, the composition was evaluated as "bad".

(Heat Resistance)

Onto a position near one edge of a strip-shaped copper plate of 1 cm×5 cm, 0.05 g of each of the above-prepared surface protection compositions was dropped at 120° C. in a spot shape. Then, the copper plate was left for two hours in an oven heated at 155° C. in a vertical configuration with its edge near which the composition was placed held upward. The state of the coating film was evaluated by visual observation. If the coating film was not dripped from the edge near which the composition was placed, the composition was evaluated as "excellent". If the coating film was partly dripped, the composition was evaluated as "good". If the coating film was entirely dripped, the composition was evaluated as "bad". Conditions such as the temperature were in accordance with JIS C60068-2-2.

(Anticorrosion Property)

A strip-shaped copper plate of 1 cm×5 cm was prepared, and a region of the plate of 2 cm from one edge was immersed into each of the surface protection compositions heated at 120° C. Then the copper plate was hung in an oven heated at 155° C. and left for two hours, in a vertical configuration with its edge where the composition was placed held upward. Then the plate was returned to a normal temperature to provide a test piece for measurement. The region of the test piece covered with a coating film was used as a cathode electrode, and an aluminum plate separately prepared was used as an anode electrode. Both electrodes were immersed into an aqueous solution of 5% sodium chloride, and a potential difference between the electrodes (i.e., corrosion current) were measured. A smaller potential difference indicates that the coating film is formed more uniformly on the copper plate and exhibits stronger adsorption to the surface of the copper plate. On the other hand, a larger potential difference indicates that the coating film is formed less uniformly on the copper plate and exhibits weaker adsorption to the surface of the copper plate. When an untreated strip-shaped copper plate without immersed into the surface protection composition was hung in an oven at 155° C. and left for two hours in a vertical configuration, and the untreated copper plate was used as a cathode electrode, the corrosion current was 80 μA. If the current measured with the test piece treated with the surface protection composition is smaller than ⅕ of the above-mentioned current value of 80 μA, the composition was evaluated as "good" in surface protection property (anticorrosion property). If the current was lower than 1/10 of the above-mentioned current value, the composition was evaluated as "excellent". If the current was ⅕ of the above-mentioned current value or larger, the composition was evaluated as "bad".

TABLE 1

| | | Samples | | | | | | | | | | Samples | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| Compound (a) | (a1) | 30.0 | — | — | — | — | — | — | — | — | — | — | — | — | — | — | — |
| | (a2) | — | 30.0 | 30.0 | 30.0 | 30.0 | 2.0 | 83.0 | 10.0 | 50.0 | 4.0 | 30.0 | — | 30.0 | 45.0 | 10.0 | 30.0 |
| Compound (b1) | (b1-1) | 30.0 | 30.0 | — | — | 30.0 | 30.0 | 6.0 | 60.0 | 12.0 | 5.0 | — | 30.0 | — | 40.0 | 70.0 | 3.0 |
| Compound (b2) | (b2-1) | — | — | 30.0 | — | — | — | — | — | — | — | — | — | — | — | — | — |
| | (b2-2) | — | — | — | 30.0 | — | — | — | — | — | — | — | — | — | — | — | — |
| | (x1) | — | — | — | — | — | — | — | — | — | — | — | — | 30.0 | — | — | — |
| Compound (c) | (c1) | 15.0 | 15.0 | 15.0 | 15.0 | — | 0.5 | 9.0 | 5.0 | 18.0 | 1.0 | 5.0 | 5.0 | 15.0 | 15.0 | 10.0 | 15.0 |
| | (c2) | — | — | — | — | 15.0 | — | — | — | — | — | — | — | — | — | — | — |
| Oil (d) | (d1) | 25.0 | 25.0 | 25.0 | 25.0 | 25.0 | 67.5 | 2.0 | 25.0 | 20.0 | 90.0 | 65.0 | 65.0 | 25.0 | — | 10.0 | 52.0 |
| P atoms in comp. (a) (mass %) | | 2.1 | 3.5 | 3.5 | 3.5 | 3.5 | 0.2 | 9.6 | 1.2 | 5.8 | 0.5 | 3.5 | 0 | 3.5 | 5.2 | 1.2 | 3.5 |
| Metal in comp. (c) (mass %) | | 8.1 | 8.1 | 8.1 | 8.1 | 8.8 | 0.3 | 4.9 | 2.7 | 9.7 | 0.5 | 2.7 | 2.7 | 8.1 | 8.1 | 5.4 | 8.1 |
| (a)/((a) + (b1) + (b2)) | | 50% | 50% | 50% | 50% | 50% | 6% | 93% | 14% | 81% | 44% | 100% | 0% | 50% | 53% | 13% | 91% |
| Evaluation | Uniform applicability | G | G | G | G | G | G | G | G | G | G | G | G | G | B | B | G |
| | Heat resistance | E | E | E | E | E | E | G | E | G | G | B | E | B | — | — | B |
| | Anticorrosion property | E | E | E | E | E | G | E | E | E | G | B | B | B | — | — | B |

E: Excellent, G: Good, B: Bad
Compound (a1): Oleyl acid phosphate
Compound (a2): 2-Ethylhexyl acid phosphate
Compound (b1): Lauryl acid phosphate
Compound (b2-1): Lauric acid
Compound (b2-2): Behenic acid
Compound (x1): Caprylic acid
Compound (c1): Calcium hydroxide
Compound (c2): Basic zinc carbonate
Compound (d1): Mineral base oil (kinematic viscosity: 10 mm$^2$/s at 100° C.)

As for Samples 1 to 10, the surface protection compositions contain the compound (a), at least one selected from the group consisting of the compound (b1) and the compound (b2), the compound (c), and the oil (d) at the specific ratios. Thus, the surface protection compositions have excellent anticorrosion property as well as excellent uniform applicability and heat resistance.

As for Sample 11, the surface protection composition, not containing any of the compound (b1) and the compound (b2), dripped from the metal surface under the high temperature condition at 155° C. Thus, the composition exhibited poor heat resistance and poor anticorrosion property. As for Sample 12, the surface protection composition, not containing the compound (a), did not adsorb to the metal surface, and exhibited high corrosion current. Thus, the composition exhibited poor anticorrosion property. As for Sample 13, the surface protection composition contained the carboxylic acid (x1) with eight carbon atoms instead of the compound (b1) or the compound (b2). Since the acid (x1) has low crystallinity because of its short linear hydrocarbon chain, the surface protection composition dripped from the metal surface under the high temperature condition of 155° C. Thus, the composition exhibited poor heat resistance and poor anticorrosion property. As for Sample 14, since the surface protection composition did not contain the oil (d), it had low fluidity and was brittle. Thus, the coating film was not formed uniformly. As for Sample 15, since the content of the compound (b1) was high, the surface protection composition had low fluidity and was brittle. Thus, the coating film was not formed uniformly. As for Sample 16, since the content of the compound (b1) was low, effect of improving heat resistance brought about by crystallization of the compound (b1) was insufficient, and the surface protection composition dripped from the metal surface under the high temperature condition of 155° C. Thus, the composition exhibited poor heat resistance and poor anticorrosion property.

The embodiment of the present disclosure has been described specifically but the present disclosure is no way restricted to the embodiment described above but can be modified variously within a range not departing from the gist of the present disclosure.

The invention claimed is:

1. A surface protection composition comprising:
   a phosphorus compound (a) represented by the general formula (1) in an amount of 0.1 to 10 mass % in terms of phosphorus element with respect to the total amount of the composition;
   at least one selected from the group consisting of a phosphorus compound (b1) represented by the general formula (2) and a carboxylic acid compound (b2) represented by the general formula (3) in an amount of 5.0 to 60 mass % with respect to the total amount of the composition;
   a metal-containing compound (c) in an amount of 0.1 to 10 mass % in terms of metal element with respect to the total amount of the composition; and
   a lubricant base oil (d),
   wherein
   the composition does not contain a consistency improver which gels with the lubricant base oil (d), and
   the general formula (1) is:

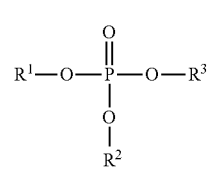

(1)

where R$^1$ represents a hydrogen atom, R$^2$ represents a hydrocarbon group with 4 to 30 carbon atoms having one or more branched chains or one or more carbon-carbon double bonds, and $R^3$ represents a hydrogen atom or a hydrocarbon group with 4 to 30 carbon atoms;

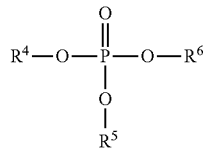

where $R^4$ represents a hydrogen atom, $R^5$ represents a linear hydrocarbon group with 12 to 22 carbon atoms, and $R^6$ represents a hydrogen atom or a hydrocarbon group with 12 to 22 carbon atoms;

$$R^7\text{—COOH} \tag{3}$$

where $R^7$ represents a linear hydrocarbon group with 11 to 21 carbon atoms, and the lubricant base oil (d) has a kinematic viscosity of 10 mm$^2$/s or higher at 100° C. and a number-average molecular weight of 400 or higher.

2. The surface protection composition according to claim 1, wherein a mass ratio (a):{(b1)+(b2)} of the compound (a) to the total of the compound (b1) and the compound (b2) is within a range of 5:95 to 95:5.

3. The surface protection composition according to claim 2, wherein a metal in the compound (c) is at least one selected from the group consisting of alkali metals, alkaline earth metals, aluminum, titanium, and zinc.

4. The surface protection composition according to claim 3, wherein the lubricant base oil (d) is contained in the composition in an amount of 5.0 to 90 mass % with respect to the total amount of the composition.

5. The surface protection composition according to claim 4, wherein the lubricant base oil (d) has a kinematic viscosity in the range of from 10 mm$^2$/s to 150 mm$^2$/s at 100° C. and a number-average molecular weight in the range of from 400 to 10000.

6. A terminal-fitted electric wire comprising:
a terminal;
an electric conductor; and
an electric connection part formed between the terminal and the electric conductor, covered with the surface protection composition according to claim 5.

7. The surface protection composition according to claim 1, wherein a metal in the compound (c) is at least one selected from the group consisting of alkali metals, alkaline earth metals, aluminum, titanium, and zinc.

8. The surface protection composition according to claim 1, wherein the lubricant base oil (d) is contained in the composition in an amount of 5.0 to 90 mass % with respect to the total amount of the composition.

9. The surface protection composition according to claim 1, wherein the lubricant base oil (d) has a kinematic viscosity of 15 mm$^2$/s or higher at 100° C. and a number-average molecular weight of 450 or higher.

10. A terminal-fitted electric wire comprising:
a terminal;
an electric conductor; and
an electric connection part formed between the terminal and the electric conductor, covered with the surface protection composition according to claim 1.

11. A surface protection composition comprising:
a phosphorus compound (a) represented by the general formula (1) in an amount of 0.1 to 10 mass % in terms of phosphorus element with respect to the total amount of the composition;
at least one selected from the group consisting of a phosphorus compound (b1) represented by the general formula (2) and a carboxylic acid compound (b2) represented by the general formula (3) in an amount of 5.0 to 60 mass % with respect to the total amount of the composition;
a metal-containing compound (c) in an amount of 0.1 to 10 mass % in terms of metal element with respect to the total amount of the composition; and
a lubricant base oil (d);
wherein
the composition does not contain an amide compound, and
the general formula (1) is:

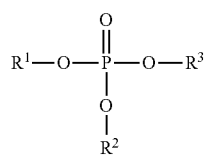

where $R^1$ represents a hydrogen atom, $R^2$ represents a hydrocarbon group with 4 to 30 carbon atoms having one or more branched chains or one or more carbon-carbon double bonds, and $R^3$ represents a hydrogen atom or a hydrocarbon group with 4 to 30 carbon atoms;

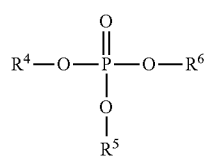

where $R^4$ represents a hydrogen atom, $R^5$ represents a linear hydrocarbon group with 12 to 22 carbon atoms, and $R^6$ represents a hydrogen atom or a hydrocarbon group with 12 to 22 carbon atoms;

$$R^7\text{—COOH} \tag{3}$$

where $R^7$ represents a linear hydrocarbon group with 11 to 21 carbon atoms, and the lubricant base oil (d) has a kinematic viscosity of 10 mm$^2$/s or higher at 100° C. and a number-average molecular weight of 400 or higher.

12. A terminal-fitted electric wire comprising:
a terminal;
an electric conductor; and
an electric connection part formed between the terminal and the electric conductor, covered with the surface protection composition according to claim 11.

\* \* \* \* \*